United States Patent Office 3,153,645
Patented Oct. 20, 1964

3,153,645
17α,21 - (2 - HALO - 1 - DI - LOWER - ALKYLAMINO-
2 - HALOALKYLIDENEDIOXY) - STEROIDS AND
PROCESS FOR THE PREPARATION THEREOF
Donald E. Ayer, Portage Township, Kalamazoo County,
Mich., assignor to The Upjohn Company, Kalamazoo,
Mich., a corporation of Delaware
No Drawing. Filed July 31, 1962, Ser. No. 213,612
20 Claims. (Cl. 260—239.55)

This invention relates to a novel class of steroids, namely, orthoamides. It is particularly concerned with 17α,21 - (2 - halo - 1 - di - lower - alkylamino - 2 - haloalkylidenedioxy)-4-pregnene-3,20-dione and the 11β-hydroxy, 11-keto, 6α-fluoro, 6α-chloro, 6α-methyl, 9α-fluoro, 16α-methyl, 16α-fluoro, 16α-chloro, 1-dehydro, 6-dehydro, 1,6-bisdehydro derivatives thereof substituted individually or in combination and corresponding otherwise thereto, and all of the foregoing compounds having instead of a 1-di-lower-alkylamino group, a corresponding substituent wherein the aforesaid group is replaced by the residue of a heterocyclic radical containing from 5 to 7 ring atoms, inclusive.

The novel compounds and process of this invention are illustratively represented by the following sequence of formulae:

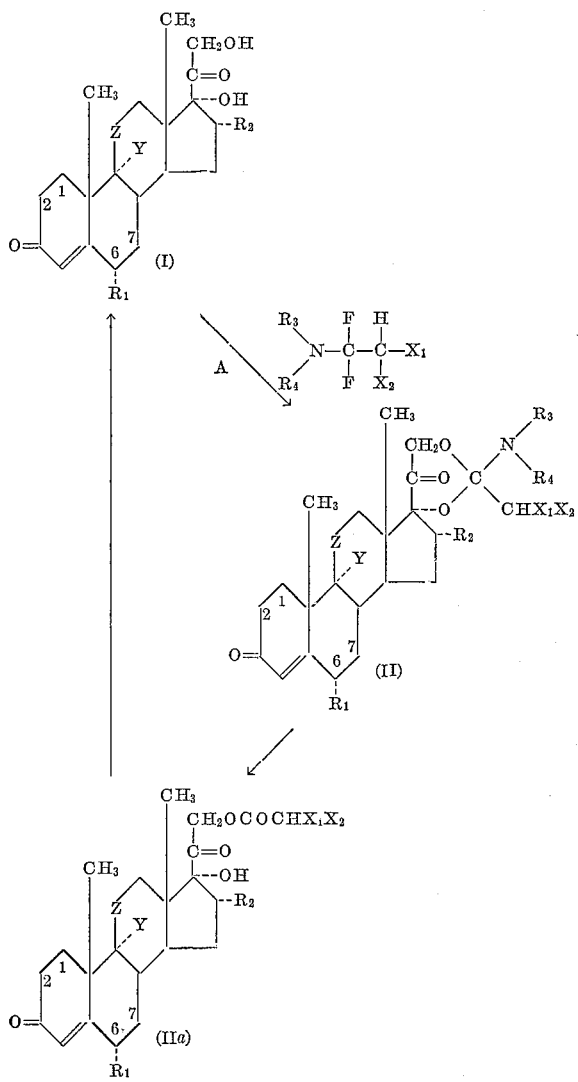

wherein the 1,2- and 6,7-carbon linkages are selected from the group consisting of single bonds and double bonds; $R_1$ is selected from the group consisting of hydrogen, methyl and fluorine; $R_2$ is selected from the group consisting of hydrogen and methyl; $R_3$ and $R_4$ taken individually represent lower-alkyl and $R_3$ and $R_4$ taken together with the attached nitrogen atom represent the residue of a heterocyclic radical containing from five to seven ring atoms, inclusive; $X_1$ is selected from the group consisting of chlorine and fluorine; $X_2$ is selected from the group consisting of chlorine, fluorine and trifluoromethyl; Z is selected from the group consisting of the methylene radical (>CH$_2$), the β-hydroxymethylene radical

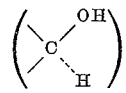

and the carbonyl radical (>C=O); Y is hydrogen, and when Z is selected from the group consisting of the β-hydroxymethylene and carbonyl radicals, Y is selected from the group consisting of hydrogen and fluorine; Y and Z taken together is selected from the group consisting of hydrogen and a double bond at the 9(11)-position.

The term "lower-alkyl" means an alkyl radical containing from 1 to 8 carbon atoms, inclusive, such as methyl, ethyl, propyl, butyl, amyl, hexyl, heptyl, octyl, and isomeric forms thereof. The term "heterocyclic radical containing from 5 to 7 ring atoms, inclusive" is inclusive of pyrrolidino, 2-methylpyrrolidino, 2,2-dimethylpyrrolidino, and like alkylpyrrolidino groups, 4-methylpiperazino, 2,4-dimethylpiperazino, and like alkylpiperazino groups, morpholino, piperidino, 2-methylpiperidino, 3-methylpiperidino, and like alkylpiperidino groups, hexamethyleneimino, homomorpholino, and the like.

The novel products of this invention embraced by Formula II, above, are obtained by the process which comprises reacting a 17α,21-dihydroxysteroid represented by Formula I, above, in an appropriate solvent with from about 1.1 to about 10 mole-equivalents of a reagent of the Formula A

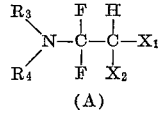

(A)

wherein $R_3$, $R_4$, $X_1$ and $X_2$ have the same meaning as above.

Examples of reagents having the Formula A are

N-(2-chloro-1,1,2-trifluoroethyl)diethylamine,
N-(1,1,2,2-tetrafluoroethyl)diethylamine,
N-(2-chloro-1,1,2-trifluoroethyl)dimethylamine,
N-(2-chloro-1,1,2-trifluoroethyl)dipropylamine,
N-(2-chloro-1,1,2-trifluoroethyl)diisobutylamine,
N-(2-chloro-1,1,2-trifluoroethyl)dioctylamine,
N-(2-chloro-1,1,2-trifluoroethyl)methylethylamine,
N-(2,2-dichloro-1,1-difluoroethyl)diethylamine,
N-(1,1,2,3,3,3-hexafluoropropyl)diethylamine,
N-(1,1,2,2-tetrafluoroethyl)-diisopropylamine, and the like.

The method of producing the reagent N-(2-chloro-1,1,2-trifluoroethyl)diethylamine of the Formula A-1

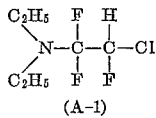

(A-1)

is described fully in Preparation 1, below. This reagent A-1 is used to prepare compounds of Formula II wherein $R_3=R_4=$ethyl; $X_1=$chlorine and $X_2=$fluorine. To prepare compounds of Formula II wherein $R_3=R_4=$ethyl; $X_1=X_2=$chlorine, the reagent of the Formula A-2

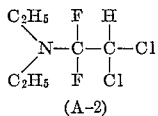

(A-2)

is employed; or instead, N,N-diethyltrichlorovinylamine of the Formula A-3

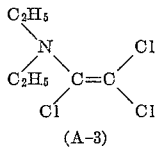

(A-3)

can be used.

The term "appropriate solvent" means any organic solvent which does not react with the reagent (A) and in which the steroid starting material is appreciably soluble such as aromatic and aliphatic hydrocarbons, halogenated hydrocarbons, esters, ketones, ethers and tertiary alcohols. Examples of such solvents are benzene, toluene, chlorobenzene, pentane, hexane, cyclohexane, ethyl acetate, butyl acetate, acetone, methyl ethyl ketone, tetrahydrofuran, ethyl ether, t-butyl alcohol, t-amyl alcohol, and the like. Since the starting materials are frequently only slightly soluble in non-polar solvents, a polar solvent such as tetrahydrofuran is preferred. However, the reaction Formula I→Formula II occurs when a suspension of the starting material in a non-polar solvent such as methylene chloride or benzene is employed.

The reaction (I→II) is completed in a period of time varying from between about one and about twenty-four hours; the time required is dependent on the reaction temperature, which can range from between about 0° C. to the boiling point of the solvent employed. Excess reagent (A) is destroyed by addition of water or other hydroxylic solvent and the product (II) isolated by conventional means. Additional purification of the product can be accomplished by usual methods, e.g., gradient elution chromatography from an adsorbent column with a suitable mixture of solvents, such as methylene chloride-Skellysolve B (hexanes), acetone-Skellysolve B, and the like.

Advantageously, but not necessarily, the process of (I→II) of the invention is carried out in the presence of an acid catalyst. The acid catalysts which are employed for this purpose are proton-forming acids such as the hydrogen halides, phosphoric acid, sulfuric acid, and the like or Lewis acids (see Fieser and Fieser, "Organic Chemistry," third edition, page 138, Reinhold 1956), such as boron trifluoride, boron trichloride, aluminum trifluoride, arsenic trifluoride, phosphorus pentafluoride, titanium tetrafluoride, and the like. The preferred acids are the hydrogen halides, particularly hydrogen fluoride. In the case of hydrogen fluoride, the acid can be added to the reaction mixture or can be generated in situ, for example, by addition of the requisite quantity of water or an aliphatic alcohol such as methanol, ethanol, and the like, to produce the desired quantity of hydrogen fluoride by reaction with the reagent (A) as follows:

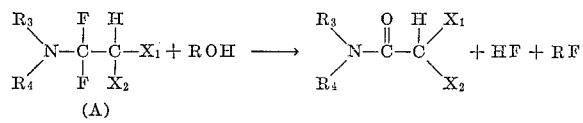

wherein $R_3$, $R_4$, $X_1$, and $X_2$ have the significance hereinbefore described and R represents hydrogen or lower-alkyl.

In general the acid catalyst is added to the reaction mixture in catalytic quantities only, i.e., of the order of about 0.1 to about 25 percent of the starting dihydroxy steroid on a mole equivalent basis. Usually sufficient water is present initially in the reaction mixture to generate catalytic amounts of hydrogen fluoride.

The compounds of Formula II of this invention can be hydrolyzed, for example, by reacting them with a mineral acid such as sulfuric or hydrochloric acid in a suitable solvent (e.g., acetone or a lower-alkanol) at moderate (room) temperature, to obtain the corresponding 17α-hydroxy-21-dihaloacetates represented by Formula IIa. The thus produced compound (IIa) are readily converted to the corresponding 17α,21-dihydroxy steroids of Formula I by treatment with a weak base, e.g., potassium carbonate, sodium bicarbonate and the like.

The 17α,21-(2-halo-1-di-lower-alkylamino-2-haloalkylidenedioxy) derivatives (II) of this invention, obtained from biologically active corresponding 17α,21-dihydroxy-steroids (I), exhibit altered pharmacodynamic effects as compared to the parent compounds. The compounds embraced by Formulae II (and IIa) possess anti-inflammatory and progestational properties of improved therapeutic ratio. Their anti-inflammatory activity renders them useful in the treatment of congestive heart failure, allergic reactions, rheumatoid arthritis and related illnesses in valuable domestic animals. Inasmuch as the compounds represented by Formulae II and IIa are high potent progestational agents, active both orally and parenterally, they are useful by themselves or, if desired, in combination with androgens (e.g., 17-methyltestosterone) and estrogens (e.g., diethylstilbesterol and ethinylestradiol) in the treatment of valuable domestic animals to control such conditions as functional uterine bleeding and dysmenorrhea; also in the maintenance of pregnancy and the regulation of fertility.

The compounds of the present invention can be prepared and administered to mammals, birds and animals in a wide variety of oral and parenteral dosage forms, simply or in admixture with other co-acting compounds. They can be associated with a carrier which can be a solid material or a liquid in which the compound is dissolved, dispersed or suspended. They also can be used in the form of ointments, lotions, creams, jellies and drops suitable for the treatment of inflamed skin areas, eyes, ears, or nose irritations. The solid compositions can take the form of tablets, powder, capsules, or the like, preferably in unit dosage forms for simple administration of precise dosages. Liquid compositions can be prepared of these compounds taking the form of solutions, emulsions, suspensions, or elixirs and injectables, particularly intra-articular injectables.

In addition to the therapeutic uses set forth above, the compounds embraced by Formula II are useful as intermediates in the preparation of known physiologically active steroids; since they are stable to treatment with base, reactions can be carried out elsewhere in the steroid molecule (under basic conditions) which could cause side chain rearrangement or degradation if the 17α,21-diol substituents remained unprotected. For example:

(a) the 17α,21-alkylidenedioxy compounds (II) can be alkylated at $C_{21}$ by treatment with an alkyl halide such as methyl iodide in the presence of potassium t-butoxide in t-butanol. The 21-methyl corticoids thus produced are valuable anti-inflammatory agents exhibiting reduced mineral retaining activity. The preparation of these compounds is disclosed in U.S. Patent 2,915,434 and 2,977,377 while their anti-inflammatory activities are reported in Acta Endocrinologica 38, 137 (1961);

(b) the Oppenauer oxidation, which ordinarily produces D-homosteroids when applied to corticoids with an unprotected side chain is made possible with the novel derivatives of Formula II;

(c) epimerization of 6β-fluorosteroids to the commercially important 6α-counterparts (ordinarily restricted to acid conditions which must be carefully controlled to avoid dehydration of the 11β-hydroxy group) can be effected by employing the compound of Formula II under basic conditions which do not attack the 11-position; such conditions were previously restricted to the difficulty removed bismethylenedioxy group or to 20-ketals which are formed in lower yields.

PREPARATION 1

*N-(2-Chloro-1,1,2-Trifluoroethyl)Diethylamine (A)*

A total of 15 ml. of trifluorochloroethylene was condensed in a pressure tube cooled in an acetone-Dry Ice (solid carbon dioxide) bath. To the pressure tube was added 10.3 ml. of diethylamine previously cooled to −40° C. and the tube was then sealed, placed in an ice bath and allowed to warm slowly to room temperature. The tube and contents were then allowed to stand for a period of about 48 hours at room temperature before cooling the tube, opening the latter and distilling the contents under reduced pressure with minimum exposure to atmospheric moisture. There was thus obtained 15.7 g. (85% yield) of N-(2-chloro-1,1,2-trifluoroethyl)diethylamine (A) in the form of a liquid having a boiling point of 33 to 34° C. at a pressure of 6 mm. of mercury.

Using the above procedure, but replacing diethylamine by dimethylamine, diisopropylamine, dibutylamine, pyrrolidine, 2-methylpyrrolidine, 2,2-dimethylpyrrolidine, 4-methylpiperazine, morpholine, piperidine, or 2-methylpiperidine, there are obtained the following reagents of Formula A: N-(2-chloro-1,1,2-trifluoroethyl)dimethylamine, N-(2-chloro-1,1,2-trifluoroethyl)diisopropylamine, N-(2-chloro-1,1,2-trifluoroethyl)dibutylamine, N-(2-chloro-1,1,2-trifluoroethyl)pyrrolidine, N-(2-chloro-1,1,2-trifluoroethyl) - 2′ - methylpyrrolidine, N - (2 - chloro - 1,1,2 - trifluoroethyl) - 2′,2′ - dimethylpyrrolidine, N - (2-chloro-1,1,2 - trifluoroethyl) - 4′ - methylpiperazine, N-(2 - chloro - 1,1,2 - trifluoroethyl) - morpholine, N - (2-chloro-1,1,2-trifluoroethyl)piperidine, and N-(2-chloro-1,1,2-trifluoroethyl)-2′-methylpiperidine, respectively.

Similarly, using the procedure of Preparation 1, but replacing trifluorochloroethylene by 2,2,-dichloro-1,1-difluoroethylene there is obtained N-(2,2-dichloro-1,1-difluoroethyl)diethylamine (A).

Similarly, using the procedure of Preparation 1, but replacing trifluorochloroethylene by perfluoropropene there is obtained N-(1,1,2,3,3,3-hexafluoropropyl)diethylamine (A).

EXAMPLE 1

*17α,21-(2-Chloro-1-Diethylamino-2-Fluoroethylidene-dioxy)-11β-Hydroxy-4-Pregnene-3,20-Dione (II)*

A solution of 1 g. of the known compound 11β,17α,21-trihydroxy-4-pregnene-3,20-dione (hydrocortisone) (I), 0.04 ml. of methanol and 1.5 ml. of N-(2-chloro-1,1,2-trifluoroethyl)diethylamine (A) (produced as in Preparation 1) in 25 ml. of tetrahydrofuran was allowed to stand at about 25° C. for a period of about 16 hours. Twenty-five ml. of saturated sodium bicarbonate solution was added and the mixture evaporated at reduced pressure to a volume of about 25 ml. to yield a gummy precipitate. The gummy material was dissolved in methylene chloride and the resulting extract washed with sodium chloride solution, dried over magnesium sulfate and evaporated to a reddish oil containing same crystals. The mixture of oil and crystals was chromatographed on 100 g. of Florisil (synthetic magnesium silicates) by gradient elution with 2 l. each of a solvent pair consisting of 40% of acetone and Skellysolve B (hexanes) and Skellysolve B alone. A yield of 1.29 g. (91% yield) of crystalline product with a melting point of 178 to 192° C. was obtained by elution with 12 to 16% acetone-Skellysolve B. An analytical sample was obtained by crystallizations of the product from acetone-Skellysolve B, aqueous methanol and aqueous acetone to give pure 17α,21-(2-chloro-1-diethylamino-2 - fluoroethylidenedioxy) - 11β - hydroxy - 4 - pregnene-3,20-dione (II) melting at 196 to 197° C. with decomposition.

*Analysis.*—Calcd. for $C_{27}H_{39}ClFNO_5$: C, 63.33; H, 7.68; Cl, 6.92; F, 3.71; N, 2.74. Found: C, 63.43; H, 7.62; Cl, 6.96; F, 3.45; N, 3.11.

Following the procedure of Example 1, but substituting for N-(2-chloro-1,1,2-trifluoroethyl)diethylamine (A) another reagent represented by Formula A and produced in the manner disclosed in Preparation 1, yields the corresponding 17α-21-(2-halo-1-di-lower-alkylamino [or residue of a heterocyclic radical with attached nitrogen atom containing from 5 to 7 ring atoms, inclusive]-2-haloalkylidenedioxy) derivative of hydrocortisone (II).

EXAMPLE 2

*17α,21-(2-Chloro-1-Diethylamino-2-Fluoroethylidene-dioxy)-4,9(11)-Pregnadiene-3,20-Dione (II)*

A suspension of 1 g. of 17α,21-dihydroxy-4,9(11)-pregnadiene-3,20-dione (I) (prepared in the manner disclosed in Example 11 of U.S. Patent 2,852,511) in 25 ml. of tetrahydrofuran containing 0.04 ml. of methanol and 1.5 ml. of N-(2-chloro-1,1,2-trifluoroethyl)diethylamine (A) was stirred at a temperature of about 25° C. for a period of about 16 hours. A red solution containing a small amount of insoluble material, which was further treated in the manner disclosed in Example 1, yielded 1.2 g. (84% yield) of crystalline product (II). Three crystallizations of this material from aqueous methanol gave an analytical sample of 17α,21-(2-chloro-1-diethylamino-2-fluoroethylidenedioxy)-4,9(11)-pregnadiene-3,20-dione (II) with a melting point of 168 to 170° C. (decomposition).

*Analysis.*—Calcd. for $C_{27}H_{37}ClFNO_4$: C, 65.64; H, 7.55; Cl, 7.18; F, 3.85; N, 2.84. Found: C, 65.75; H, 7.58; Cl, 7.24; F, 3.53; N, 2.86.

Following the procedure of Example 2 but substituting for N-(2-chloro-1,1,2-trifluoroethyl)diethylamine (A) another reagent represented by Formula A and produced in the manner disclosed in Preparation 1, yields the corresponding 17α,21-(2-halo-1-di-lower-alkylamino [or residue of a heterocyclic radical with attached nitrogen atom containing from 5 to 7 ring atoms, inclusive]-2-haloalkylidenedioxy) derivative of 17α,21-dihydroxy-4,9(11)-pregnadiene-3,20-dione (II).

EXAMPLE 3

*17α,21-(2-Chloro-1-Diethylamino-2-Fluoroethylidenedi-oxy)-11β-Hydroxy-1,4-Pregnadiene-3,20-Dione (II)*

A solution of 4 g. of the known compound 11β,17α,21-trihydroxy-1,4-pregnadiene-3,20-dione (prednisolone) (I) [prepared as in Science 121, 176 (1955)], 0.015 ml. of methanol, 6 ml. of N-(2-cholro-1,1,2-trifluoroethyl)diethylamine (A) in 100 ml. of tetrahydrofuran was allowed to stand for a period of about 16 hours at a temperature of approximately 25° C. To this solution 100 ml. of a saturated solution of sodium bicarbonate was added, the mixture concentrated at reduced pressure and extracted with methylene chloride. The extract was washed with saturated sodium chloride solution, dried over magnesium sulfate, and evaporated to a partly crystalline residue. The residue was chromatographed on 100 g. of Florisil by linear gradient elution using 2 l. each of 40% acetone-Skellysolve B and Skellysolve B alone. Appropriate fractions were combined and crystallized from aqueous acetone to give 4.58 g. (81% yield) of 17α,21-(2-chloro-1-diethylamino - 2 - fluoroethylidenedioxy) - 11β - hydroxy-1,4-pregnadiene-3,20-dione (II), melting at 201 to 204° C. with decomposition.

*Analysis.*—Calcd. for $C_{27}H_{37}ClFNO_5$: Cl, 6.95; F, 3.73; N, 2.75. Found: Cl, 7.11; F, 3.49; N, 2.98.

Following the procedure of Example 3 but substituting for N-(2-chloro-1,1,2-trifluoroethyl)diethylamine (A) another reagent represented by Formula A and produced in the manner disclosed in Preparation 1, yields the corresponding 17α,21-(2-halo-1-di-lower-alkylamino [or residue of a heterocyclic radical with attached nitrogen atom containing from 5 to 7 ring atoms, inclusive]-2-halo-alkylidenedioxy) derivative of 11β,17α,21-trihydroxy-1,4-pregnadiene-3,20-dione (II).

EXAMPLE 4

17α,21 - (2 - Chloro - 1 - Diethylamino - 2 - Fluoroethylidenedioxy) - 9α - Fluoro - 11β - Hydroxy - 6α - methyl-1,4-Pregnadiene-3,20-Dione (II)

Four g. of 9α-fluoro-6α-methyl-11β,17α,21-trihydroxy-1,4-pregnadiene-3,20-dione (I) prepared as in Example 8 of U.S. Patent 2,964,842) was treated with N-(2-chloro-1,1,2-trifluoroethyl)diethylamine (A) in the manner disclosed in Example 3 above, to give 4.25 g. (77% yield) of 17α,21 - (2 - chloro - 1 - diethylamino - 2 - fluoroethylidenedioxy) - 9α - fluoro - 11β - hydroxy - 6α - methyl - 1, 4-pregnadiene-3,20-dione (II), melting at 201 to 206° C.

Analysis.—Calcd. for $C_{28}H_{38}ClF_2NO_5$: Cl, 6.54; F, 7.01; N, 2.58. Found: Cl, 6.67; F, 6.73; N, 2.54.

Following the procedure of Example 4 but substituting for N-(2 - chloro - 1,1,2 - trifluoroethyl)diethylamine (A) another reagent represented by Formula A and produced in the manner disclosed in Preparation 1, yields the corresponding 17α,21-(2-halo-1-di-lower-alkylamino [or residue of a heterocyclic radical with attached nitrogen atom containing from 5 to 7 ring atoms, inclusive]-2-haloalkylidenedioxy) derivative of 9α-fluoro-6α-methyl-11β,17α,21-trihydroxy-1,4-pregnadiene-3,20-dione (II).

EXAMPLE 5

17α,21-(2-Chloro-1 - Diethylamino - 2 - Fluoroethylidenedioxy)-11β-Hydroxy-6α-Methyl-1,4 - Pregnadiene-3,20-Dione (II)

Four g. of 6α-methyl-11β,17α,21-trihydroxy-1,4-pregnadiene 3,20-dione (I) (prepared as in Example 1 of U.S. Patent 2,897,218) was treated with N-(2-chloro-1,1,2-trifluoroethyl)diethylamine (A) in the manner disclosed in Example 3, above, to give 3.94 g. (70% yield) of 17α,21-(2-chloro-1-diethylamino - 2 - fluoroethylidenedioxy)-11β-hydroxy-6α-methyl-1,4-pregnadiene-3,20-dione (II), melting at 194 to 195° C.

Analysis.—Calcd. for $C_{28}H_{39}ClFNO_5$: C, 64.17; H, 7.50; Cl, 6.77; F, 3.62; N, 2.67. Found: C, 63.67; H, 7.69; Cl, 6.88; F, 3.53; N, 2.73.

Following the procedure of Example 5 but substituting for N-(2 - chloro - 1,1,2 - trifluoroethyl)diethylamine (A) another reagent represented by Formula A and produced in the manner disclosed in Preparation 1, yields the corresponding 17α,21-(2-halo-1-di-lower-alkylamino[or residue of a heterocyclic radical with attached nitrogen atom containing from 5 to 7 ring atoms, inclusive]-2-haloalkylidenedioxy) derivative of 6α - methyl - 11β,17α,21 - trihydroxy-1,4-pregnadiene-3,20-dione (II).

EXAMPLE 6

17α,21-(2-Chloro-1 - Diethylamino - 2 - Fluoroethylidenedioxy)-4-Pregnene-3,20-Dione (II)

Four g. of the known compound 17α,21-dihydroxy-4-pregnene-3,20-dione (Reichstein's "S") (I) was treated with N-(2-chloro-1,1,2-trifluoroethyl)diethylamine (A) in the manner disclosed in Example 3, to give 3.81 g. (66% yield) of 17α,21-(2-chloro-1-diethylamino-2-fluoroethylidenedioxy)-4-pregnene-3,20-dione (II), melting at 192 to 195° C.

Analysis.—Calcd. for $C_{27}H_{39}ClFNO_4$: Cl, 7.15; F, 3.83; N, 2.82. Found: Cl, 7.18; F, 3.78; N, 2.96.

Following the procedure of Example 6 but substituting for N-(2 - chloro - 1,1,2 - trifluoroethyl)diethylamine (A) another reagent represented by Formula A and produced in the manner disclosed in Preparation 1, yields the corresponding 17α,21-(2-halo-1-di-lower-alkylamino[or residue of a heterocyclic radical with attached nitrogen atom containing from 5 to 7 ring atoms, inclusive]-2-haloalkylidenedioxy) derivative of 17α,21-dihydroxy-4-pregnene-3,20-dione (II).

EXAMPLE 7

17α,21-(2-Chloro-1 - Diethylamino - 2 - Fluoroethylidenedioxy)-6β-Fluoro-11β-Hydroxy-4-Pregnene-3,20 - Dione (II)

A solution 2 g. of 6β-fluoro-11β,17α,21-trihydroxy-4-pregnene-3,20-dione (6β-fluorohydrocortisone) (I) (prepared as described in U.S. Patent 2,838,497), 0.1 ml. of methanol and 3 ml. of N-(2-chloro-1,1,2-trifluoroethyl) diethylamine in 50 ml. of tetrahydrofuran is allowed to stand at 25° C. for about 16 hours. Following addition of 50 ml. of saturated sodium bicarbonate solution the mixture is evaporated at reduced pressure and the residue extracted with methylene chloride. The organic extract is washed with water, dried over magnesium sulfate and evaporated to a crystalline residue. Crystallization from acetone-Skellysolve B gives 17α,21-(2-chloro-1-diethylamino-2-fluoroethylidenedioxy)-6β-fluoro - 11β - hydroxy-4-pregnene-3,20-dione (II).

EXAMPLE 8

17α,21-(2-Chloro-1 - Diethylamino - 2 - Fluoroethylidenedioxy)-6α-Fluoro - 11β - Hydroxy - 4 - Pregnene - 3,20-Dione (II)

To a solution of 1 g. of 17α,21-(2-chloro-1-diethylamino-2-fluoroethylidenedioxy)-6β-fluoro-11β - hydroxy-4-pregnene-3,20-dione (II) in 100 ml. of methanol is added 2 ml. of water containing 300 mg. of potassium hydroxide. The mixture is heated at reflux under an atmosphere of nitrogen for about one hour, then cooled to 25° C., acidified with glacial acetic acid and evaporated at reduced pressure to a volume of 20 ml. The concentrate is slowly diluted with 100 ml. of water to give a crystalline precipitate of 17α,21-(2-chloro-1-diethylamino-2-fluoroethylidenedioxy-6α-fluoro-11β-hydroxy-4-pregnene - 3,20-dione (II) which is filtered and dried in vacuo.

EXAMPLE 9

6α-Fluoro-11β,17α,21-Trihydroxy-4-Pregnene-3,20-Dione-21-Chloro-Fluoroacetate (IIa)

A solution of 1 g. of 17α,21-(2-chloro-1-diethylamino-2-fluoroethylidenedioxy)-6α-fluoro-11β-hydroxy - 4 - pregnene-3,20-dione (II) in 60 ml. of acetone and 6 ml. of 5% aqueous sulfuric acid is allowed to stand 16 hours at 25° C. Following addition of 4 ml. of saturated sodium bicarbonate solution, the mixture is concentrated at reduced pressure to 30 ml. and diluted slowly with 100 ml. of water to give crystalline 6α-fluoro-11β,17α,21-trihydroxy-4-pregnene-3,20-dione 21-chlorofluoroacetate (IIa).

EXAMPLE 10

6α-Fluoro-11β,17α,21-Trihydroxy-4-Pregnene-3,20-Dione (I)

A solution of 0.50 g. of 6α-fluoro-11β,17α,21-trihydroxy-4-pregnene-3,20-dione 21-chlorofluoroacetate (IIa) in 50 ml. of hot methanol is purged with nitrogen and 1 ml. of 10% aqueous potassium carbonate added. After 20 minutes 2 ml. of acetic acid is added and the reaction mixture is diluted with 20 ml. of water to give crystalline 6α-fluoro-11β,17α,21-trihydroxy-4 - pregnene - 3,20 - dione (I), melting at 192 to 195° C.

EXAMPLE 11

In this example certain of the new compounds of this invention are prepared by the novel process therefor, which is illustratively represented by the following reaction sequence:

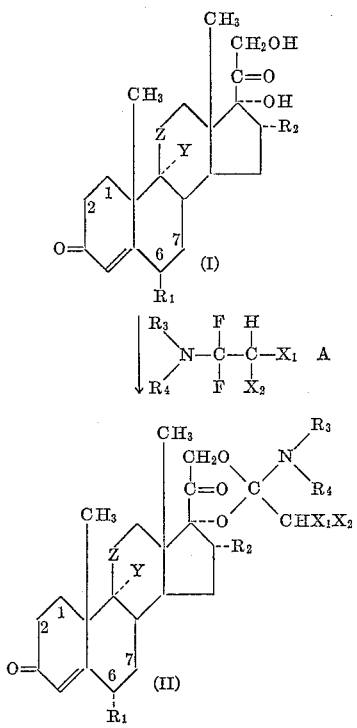

wherein $R_1$, $R_2$, $R_3$, $R_4$, $X_1$, $X_2$, Y, Z, 1, 2 and 6, 7 have the same meanings as those indicated therefor following the flow-sheet appearing in column 2, lines 1 thru 36.

Following the precedures of Examples 1 to 7 but substituting for the starting materials disclosed therein the following:

(a) 17α,21-dihydroxy-4-pregnene-3,11,20-trione (I), (b) 17α,21 - dihydroxy-1,4-pregnadiene-3,11,20-trione (I) [prepared as in Science 121, 17 (1955)], (c) 17α,21 - dihydroxy-1,4-pregnadiene-3,20-dione (I) (prepared as in German Patent 1,021,845), (d) 11β,17α,21 - trihydroxy-6α-fluoro-4-pregnene-3,20-dione (I) (prepared as in U.S. Patent 2,838,497), (e) 17α,21 - dihydroxy - 6α-fluoro-4-pregnene-3,11,20-trione (I) (prepared as in U.S. Patent 2,838,497), (f) 11β,17α,21 - trihydroxy-6α-fluoro-1,4-pregnadiene-3,20-dione (I) (prepared as in U.S. Patent 2,841,600), (g) 17α,21 - dihydroxy-6α-fluoro-1,4-pregnadiene-3,11,20-trione (I) (prepared as in U.S. Patent 2,841,600), (h) 11β,17α,21 - trihydroxy-9α-fluoro-4-pregnene-3,20-dione (I) [prepared as in Example 13(b) of U.S. Patent 2,852,511], (i) 17α,21 - dihydroxy - 9α-fluoro-4-pregnene-3,11,20-trione (I) [prepared as in Example 13(d) of U.S. Patent 2,852,511], (j) 9α - fluoro-11β,17α,21-trihydroxy-1,4-pregnadiene-3,20-dione (I) [prepared as in J. Amer. Chem. Soc. 77, 4181 (1955)], (k) 9α - fluoro-11β,17α,21-trihydroxy,4,6-pregnadiene-3,20-dione (I) [prepared as in J. Amer. Chem. Soc. 77, 4181 (1955)], (l) 11β,17α,21 - trihydroxy - 6α-methyl-4-pregnene-3,20-dione (I), (m) 11β,17α,21 - trihydroxy - 4,6 - pregnadiene - 3,20-dione (I) [prepared as in J. Amer. Chem. Soc. 79, 1257 (1957)], (n) 11β,17α,21 - trihydroxy - 1,4,6-pregnatriene-3,20-dione (I) [prepared as in J. Amer. Chem. Soc. 79, 1257 (1957)], (o) 6α,9α - difluoro-11β,17α,21-trihydroxy-4-pregnene-3,20-dione (I) (prepared as in Example 5 of U.S. Patent 2,838,498), (p) 6α,9α - difluoro - 17α,21 - dihydroxy-4-pregnene-3,11,20-trione (I) (prepared as in Example 6 of U.S. Patent 2,838,498), (q) 6α,9α - difluoro - 11β,17α,21-trihydroxy-1,4-pregnadiene-3,20-dione (I) (prepared as in Example 5 of U.S. Patent 2,838,499), (r) 6α,9α - difluoro-17α,21-dihydroxy-1,4-pregnadiene-3,11,20-trione (I) (prepared as in Example 5 of U.S. Patent 2,838,499), (s) 17α,21 - dihydoxy-6α-methyl-1,4-pregnadiene-3,11,20-trione (I) (prepared as in Example 11 of U.S. Patent 2,897,218), (t) 9α - fluoro - 6α-methyl-17α,21-dihydroxy-1,4-pregnadiene-3,11,20-trione (I) (prepared as in Example 9 of U.S. Patent 2,964,542), (u) 16α - methyl-11β,17α,21-trihydroxy-4-pregnene-3,20-dione (I) [prepared as in J. Amer. Chem. Soc. 80, 3160–3162 (1958)], (v) 16α - methyl-11β,17α,21-trihydroxy-1,4-pregnadiene-3,20-dione (I) [prepared as in J. Amer. Chem. Soc. 80, 3160–3162 (1958)], (w) 16α - methyl - 17α,21-dihydroxy-1,4-pregnadiene-3,11,20-trione (I) [prepared as in J. Amer. Chem. Soc. 80, 3160–3162 (1958)], (x) 16α - methyl-17α,21-dihydroxy-4,9(11)-pregnadiene-3,20-dione (I) [prepared as in J. Amer. Chem. Soc. 80, 3160–3162 (1958)], (y) 16α - methyl - 9α-fluoro-11β-17α,21-trihydroxy-4-pregnene-3,20-dione (I) [prepared as in J. Amer. Chem. Soc. 80, 3160–3162 (1958)], and (z) 16α - methyl-9α-fluoro-11β,17α,21-trihydroxy-1,4-pregnadiene-3,20-dione (I) [prepared as in J. Amer. Chem. Soc. 80, 3160–3162 (1958)], yield, respectively, (a′) 17α,21 - (2-chloro - 1-diethylamino-2-fluoroethylidenedioxy)-4-pregnene-3,11,20-trione (II), (b′) 17α,21 - (2 - chloro-1-diethylamino-2-fluoroethylidenedioxy)-1,4-pregnadiene-3,11,20-trione (II), (c′) 17α,21 - (2 - chloro-1-diethylamino-2-fluoroethylidenedioxy)-1,4-pregnadiene-3,20-dione (II), (d′) 17α,21 - (2 - chloro-1-diethylamino-2-fluoroethylidenedioxy) - 11β - hydroxy - 6α - fluoro-4-pregnene-3,20-dione (II), (e′) 17α,21 - (2 - chloro-1-diethylamino-2-fluoroethylidenedioxy)-6α-fluoro-4-pregnene-3,11,20-trione (II), (f′) 17α,21 - (2 - chloro-1-diethylamino-2-fluoroethylidenedioxy) - 11β - hydroxy - 6α - fluoro-1,4-pregnadiene-3,20-dione (II), (g′) 17α,21 - (2 - chloro-1-diethylamino-2-fluoroethylidenedioxy) - 6α - fluoro - 1,4 - pregnadiene-3,11,20-trione (II), (h′) 17α,21 - (2 - chloro-1-diethylamino-2-fluoroethylidenedioxy) - 11β - hydroxy - 9α - fluoro-4-pregnene-3,20-dione (II), (i′) 17α,21-(2-chloro-1-diethylamino-2-fluoroethylidenedioxy)-9α-fluoro-4-pregnene-3,11,20-trione (II), (j′) 17α,21-(2-chloro-1-diethylamino-2-fluoroethylidenedioxy)-11β-hydroxy-9α-fluoro-1,4-pregnadiene-3,20-dione (II), (k′) 17α,21-(2-chloro-1-diethylamino-2-fluoroethylidenedioxy)-11β-hydroxy-9α-fluoro-4,6-pregnadiene-3,20-dione (II), (l′) 17α,21-(2-chloro-1-diethylamino-2-fluoroethylidenedioxy)-11β-hydroxy-6α-methyl-4-pregnene-3,20-dione (II), (m′) 17α,21-(2-chloro-1-diethylamino-2-fluoroethylidenedioxy)-11β-hydroxy-4,6-pregnadiene-3,20-dione (II), (n′) 17α,21-(2-chloro-1-diethylamino-2-fluoroethylidenedioxy)-11β-hydroxy-1,4,6-pregnatriene-3,20-dione (II), (o′) 17α,21-(2-chloro-1-diethylamino-2-fluoroethylidenedioxy)-6α,9α-difluoro-11β-hydroxy-4-pregnene-3,20-dione (II), (p′) 17α,21-(2-chloro-1-diethylamino-2-fluoroethylidenedioxy)-6α,9α-difluoro-4-pregnene-3,11,20-trione (II), (q′) 17α,21-(2-chloro-1-diethylamino-2-fluoroethylidenedioxy)-6α,9α-difluoro-11β-hydroxy-1,4-pregnadiene-3,20-dione (II), (r') 17α,21-(2-chloro-1-diethylamino-2-fluoroethylidenedioxy)-6α,9α-difluoro-1,4-pregnadiene-3,11,20-trione(II), (s') 17α,21-(2-chloro-1-diethylamino - 2 - fluoroethylidenedioxy)-6α-methyl-1,4-pregnadiene-3,11,20-trione (II), (t') 17α,21-(2-chloro-1-diethylamino-2-fluoroethylidenedioxy)-9α-fluoro-6α-methyl-1,4-pregnadiene-3,11,20-trione (II), (u') 17α,21-(2-chloro-1-diethylamino-2-fluoroethylidenedioxy)-11β-hydroxy-16α-methyl-4-pregnene-3,20-dione (II), (v') 17α,21-(2-chloro-1-diethylamino-2-fluoroethylidenedioxy)-11β-hydroxy-16α-methyl-1,4-pregnadiene-3,20-dione (II), (w') 17α,21-(2-chloro-1-diethylamino-2-fluoroethylidenedioxy)-16α-methyl-1,4-pregnadiene-3,11,20-trione (II), (x') 17α,21-(2-chloro-1-diethylamino-2-fluoroethylidenedioxy)-16α-methyl-4,9(11)-pregnadiene-3,20-dione (II), (y')-17α,21-(2-chloro-1-diethylamino-2-fluoroethylidenedioxy)-9α-fluoro-11β-hydroxy-16α-methyl-4-pregnene-3,20-dione (II) and (z') 17α,21-(2-chloro-1-diethylamino-2-fluoroethylidenedioxy)-9α-fluoro-11β-hydroxy-16α-methyl-1,4-pregnadiene-3,20-dione (II).

Following the procedure of Example 11 but substituting for N-(2-chloro-1,1,2-trifluoroethyl)diethylamine (A) another reagent represented by Formula A and produced in the manner disclosed in Preparation 1, yields the corresponding 17α,21-(2-halo-1-di-lower-alkylamino [or residue of a heterocyclic radical with attached nitrogen atom containing from 5 to 7 ring atoms, inclusive]-2-haloalkylidenedioxy) derivatives (II) of the compounds represented by Formula I.

EXAMPLE 12

*Hydrolysis of 17α,21-(2-Chloro-1-Diethylamino-2-Fluoroethylidenedioxy)-11β-Hydroxy-4-Pregnene-3,20 - Dione (II)*

(a) A solution of 0.5 g. of 17α,21-(2-chloro-1-diethylamino - 2 - fluoroethylidenedioxy) - 11β - hydroxy-4-pregnene-3,20-dione (II) (from Example 1) in 30 ml. of acetone and 3 ml. of 5% aqueous sulfuric acid was allowed to stand for a period of about 28 hours at a temperature of about 25° C. To the reaction mixture there was added 2 ml. of saturated sodium bicarbonate solution, the liquid evaporated at reduced pressure and the residue extracted with methylene chloride. Evaporation of the methylene chloride left 0.45 g. of product as a white foam (IIa). Recrystallization of this material twice from a mixture of acetone and Skellysolve B gave an analytical sample of 11β,17α,21-trihydroxy-4-pregnene-3,20-dione, 21 - chlorofluoroacetate (IIa), with a melting point of 189 to 193° C., $\nu_{max}^{Nujol}$ 3400, 3310, 1778, 1730, 1630 and 1613 cm.$^{-1}$

*Analysis.*—Calcd. for $C_{23}H_{30}FClO_6$: Cl, 7.76. Found: Cl, 7.62.

(b) A solution of 30 mg. of 11β,17α,21-trihydroxy-4-pregnene-3,20-dione, 21 - chlorofluoroacetate (IIa) in 3 ml. of hot methanol was purged with nitrogen, 0.05 ml. of 0.725 molar aqueous potassium carbonate solution added and after about 20 minutes the reaction was quenched with 0.1 ml. of acetic acid. The solution was diluted with 1 ml. of water to give 25 mg. of crystalline 11β,17α,21-trihydroxy-4-pregnene-3,20-dione (hydrocortisone) (I) with a melting point of 212 to 220° C.

Following the procedure of Example 12 but substituting for 17α,21 - (2-chloro-1-diethylamino-2-fluoroethylidenedioxy)-11β-hydroxy-4-pregnene-3,20-dione (II) the following 17α,21 - (2-halo-1-di-lower-alkylamino-2-haloalkylidenedioxy) compounds (II) prepared as in Examples 1 to 7, as starting materials:

(1) 17α,21-(2-chloro-1-diethylamino-2-fluoroethylidenedioxy)-11β-hydroxy-4-pregnene-3,20-dione (II), (2) 17α,21-(2-chloro-1-diethylamino-2-fluoroethylidenedioxy)-4-,9(11)-pregnadiene-3,20-dione (II), (3) 17α,21-(2-chloro-1-diethylamino-2-fluoroethylidenedioxy)-11β-hydroxy-1,4-pregnadiene-3,20-dione (II), (4) 17α,21-(2-chloro-1-diethylamino-2-fluoroethylidenedioxy)-9α-fluoro-11β-hydroxy-6α-methyl-1,4-pregnadiene-3,20-dione (II), (5) 17α,21-(2-chloro-1-diethylamino-2-fluoroethylidenedioxy)-11β-hydroxy-6α-methyl-1,4-pregnadiene-3,20-dione (II), (6) 17α,21-(2-chloro-1-diethylamino-2-fluoroethylidenedioxy)-4-pregnene-3,20-dione (II), (7a') 17α,21-(2-chloro-1-diethylamino-2-fluoroethylidenedioxy)-4-pregnene-3,11,20-trione (II), (7b') 17α,21-(2-chloro-1-diethylamino-2-fluoroethylidenedioxy)-1,4-pregnadiene-3,11,20-trione (II), (7c') 17α,21-(2-chloro-1-diethylamino-2-fluoroethylidenedioxy)-1,4-pregnadiene-3,20-dione (II), (7d') 17α,21-(2-chloro-1-diethylamino-2-fluoroethylidenedioxy)-11β-hydroxy-6α-fluoro-4-pregnene-3,20-dione (II), (7e') 17α,21-(2-chloro-1-diethylamino-2-fluoroethylidenedioxy)-6α-fluoro-4-pregnene-3,11,20-trione (II), (7f') 17α,21-(2-chloro-1-diethylamino-2-fluoroethylidenedioxy)-11β-hydroxy-6α-fluoro-1,4-pregnadiene-3,20-dione (II), (7g') 17α,21-(2-chloro-1-diethylamino-2-fluoroethylidenedioxy)-6α-fluoro-1,4-pregnadiene-3,11,20-trione (II), (7h') 17α,21-(2-chloro-1-diethylamino-2-fluoroethylidenedioxy)-11β-hydroxy-9α-fluoro-4-pregnene-3,20-dione (II), (7i') 17α,21-(2-chloro-1-diethylamino-2-fluoroethylidenedioxy)-9α-fluoro-4-pregnene-3,11,20-trione (II), (7j') 17α,21-(2-chloro-1-diethylamino-2-fluoroethylidenedioxy)-11β-hydroxy-9α-fluoro-1,4-pregnadiene-3,20-dione (II), (7k') 17α,21-(2-chloro-1-diethylamino-2 - fluoroethylidenedioxy)-11β-hydroxy-9α-fluoro-4,6-pregnadiene-3,20-dione (II), (7l') 17α,21-(2-chloro-1-diethylamino-2-fluoroethylidenedioxy)-11β-hydroxy-6α-methyl-4-pregnene-3,20-dione (II), (7m') 17α,21-(2-chloro-1-diethylamino-2-fluoroethylidenedioxyl)-11β-hydroxy-4,6-pregnadiene-3,20-dione (II), (7n') 17α,21-(2-chloro-1-diethylamino-2-fluoroethylidenedioxy)-11β-hydroxy-1,4,6-pregnatriene-3,20-dione (II), (7o') 17α,21-(2-chloro-1-diethylamino-2 - fluoroethylidenedioxy)-6α,9α-difluoro-11β-hydroxy-4-pregnene-3,20-dione (II), (7p') 17α,21-(2-chloro-1-diethylamino-2-fluoroethylidenedioxy)-6α,9α-difluoro-4-pregnene-3,11,20-trione (II), (7q') 17α,21-(2-chloro-1-diethylamino-2-fluoroethylidenedioxy)-6α,9α-difluoro-11β-hydroxy-1,4-pregnadiene-3,20-dione (II), (7r') 17α,21-(2-chloro-1-diethylamino-2-fluoroethylidenedioxy)-6α,9α-difluoro-1,4-pregnadiene-3,11,20-trione (II), (7s') 17α,21-(2-chloro-1-diethylamino-2-fluoroethylidenedioxy)-6α-methyl-1,4-pregnadiene-3,11,20-trione (II), (7t') 17α,21-(2-chloro-1-diethylamino-2-fluoroethylidenedioxy)-9α-fluoro-6α-methyl-1,4-pregnadiene-3,11,20-trione (II), (7u') 17α,21-(2-chloro-1-diethylamino-2-fluoroethylidenedioxy)-11β-hydroxy-16α-methyl-4 - pregnene - 3,20-dione (II), (7v') 17α,21 - (2-chloro-1-diethylamino-2-fluoroethylidenedioxy) - 11β - hydroxy-16α-methyl-1,4-pregnadiene-3,20-dione (II), (7w') 17α,21 - (2 - chloro-1-diethylamino-2-fluoroethylidenedioxy) - 16α - methyl-1,4-pregnadiene-3,11,20-trione(II), (7x') 17α,21 - (2 - chloro-1-diethylamino-2-fluoroethylidenedioxy) - 16α - methyl - 4,9(11)-pregnadiene-3,20-dione(II), (7y') 17α,21 - (2 - chloro - 1 - diethylamino-2-fluoroethylidenedioxy) - 9α - fluoro-11β-hydroxy-16α-methyl-4-pregnene-3,20-dione(II) and (7z') 17α,21 - (2 - chloro-1-diethylamino-2-fluoroethylidenedioxy) - 9α - fluoro-11β-hydroxy-16α-methyl-1,4-pregnadiene-3,20-dione (II), yield, respectively, (1″) 11β,17α,21-trihydroxy-4-pregnene-3,20-dione, 21-chlorofluoroacetate(IIa), (2″) 17α,21 - dihydroxy - 4,9(11) - pregnadiene-3,20-dione, 21-chlorofluoroacetate(IIa), (3″) 11β,17α,21 - trihydroxy-1,4-pregnadiene-3,20-dione, 21-chlorofluoroacetate(IIa), (4″) 9α - fluoro - 6α-methyl-11β,17α,21-trihydroxy-1,4-pregnadiene-3,20-dione, 21-chlorofluoroacetate(IIa), (5″) 6α - methyl -11β,17α,21-trihydroxy-1,4-pregnadiene-3,20-dione, 21-chlorofluoroacetate(IIa), (6″) 17α,21 - dihydroxy-4-pregnene-3,20-dione, 21-chlorofluoroacetate(IIa), (7a″) 17α,21-dihydroxy-4-pregnene-3,11,20-trione, 21-chlorofluoroacetate(IIa), (7b″) 17α,21 - dihydroxy-1,4-pregnadiene-3,11,20-trione, 21-chlorofluoroacetate(IIa), (7c″) 17α,21 - dihydroxy-1,4-pregnadiene-3,20-dione, 21-chlorofluoroacetate(IIa), (7d″) 11β,17α,21 - trihydroxy - 6α - fluoro-4-pregnene-3,20-dione, 21-chlorofluoroacetate(IIa), (7e″) 17α,21-dihydroxy-6α-fluoro-4-pregnene-3,11,20-trione, 21-chlorofluoroacetate(IIa), (7f″) 11β,17α,21-trihydroxy-6α-fluoro-1,4-pregnadiene-3,20-dione, 21-chlorofluoroacetate(IIa), (7g″) 17α,21 - dihydroxy-6α-fluoro-1,4-pregnadiene-3,11,20-trione, 21-chlorofluoroacetate(IIa), (7h″) 11β,17α,21 - trihydroxy-9α-fluoro-4-pregnene-3,20-dione, 21-chlorofluoroacetate(IIa), (7i″) 17α,21-dihydroxy-9α-fluoro-4-pregnene-3,11,20-trione, 21-chlorofluoroacetate(IIa), (7j″) 9α-fluoro-11β,17α,21-trihydroxy-1,4-pregnadiene-3,20-dione, 21-chlorofluoroacetate(IIa), (7k″) 9α - fluoro - 11β,17α,21-trihydroxy-4,6-pregnadiene-3,20-dione, 21-chlorofluoroacetate(IIa), (7l″) 11β,17α,21 - trihydroxy-6α-methyl-4-pregnene-3,20-dione, 21-chlorofluoroacetate(IIa), (7m″) 11β,17α,21-trihydroxy-4,6-pregnadiene-3,20-dione, 21-chlorofluoroacetate(IIa), (7n″) 11β,17α,21 - trihydroxy-1,4,6-pregnatriene-3,20-dione, 21-chlorofluoroacetate(IIa), (7o″) 6α,9α - difluoro - 11β,17α,21 - trihydroxy - 4-pregnene-3,20-dione, 21-chlorofluoroacetate(IIa), (7p″) 6α,9α - difluoro-17α,21-dihydroxy-4-pregnene-3,11,20-trione, 21-chlorofluoroacetate(IIa), (7q″) 6α,9α - difluoro - 11β,17α,21 - trihydroxy - 1,4-pregnadiene-3,20-dione, 21-chlorofluoroacetate(IIa), (7r″) 6α,9α - difluoro-17α,21-dihydroxy-1,4-pregnadiene-3,11,20-trione, 21-chlorofluoroacetate(IIa), (7s″) 17α,21 - dihydroxy-6α-methyl-1,4-pregnadiene-3,11,20-trione, 21-chlorofluoroacetate(IIa), (7t″) 9α - fluoro - 6α - methyl-17α,21-dihydroxy-1,4-pregnadiene-3,11,20-trione, 21-chlorofluoroacetate(IIa), (7u″) 16α-methyl-11β,17α,21-trihydroxy-4-pregnene-3,20-dione, 21-chlorofluoroacetate(IIa), (7v″) 16α-methyl-11β,17α,21-trihydroxy-1,4-pregnadiene-3,20-dione, 21-chlorofluoroacetate(IIa), (7w″) 16α-methyl-17α,21-dihydroxy1,4-pregnadiene-3,11,20-trione, 21-chlorofluoroacetate(IIa), (7x″) 16α-methyl-17α,21-dihydroxy-4,9(11)-pregnadiene-3,20-dione, 21-chlorofluoroacetate(IIa), (7y″) 16α - methyl-9α-fluoro-11β,17α,21-trihydroxy-4-pregnene-3,20-dione, 21-chlorofluoroacetate(IIa), and (7z″) 16α-methyl-9α-fluoro-11β,17α,21-trihydroxy-1,4-pregnadiene-3,20-dione, 21-chlorofluoroacetate(IIa);

(1‴) 11β,17α,21-trihydroxy-4-pregnene-3,20-dione(I), (2‴) 17α,21 - dihydroxy-4,9(11)-pregnadiene-3,20-dione(I), (3‴) 11β,17α,21 - trihydroxy-1,4-pregnadiene-3,20-dione(I), (4‴) 9α - fluoro-6α-methyl-11β,17α,21-trihydroxy-1,4-pregnadiene-3,20-dione(I), (5‴) 6α-methyl - 11β,17α,21-trihydroxy-1,4-pregnadiene-3,20-dione(I), (6‴) 17α,21-dihydroxy-4-pregnene-3,20-dione(I), (7a‴) 17α,21-dihydroxy-4-pregnene-3,11,20-trione(I), (7b‴) 17α,21 - dihydroxy-1,4-pregnadiene-3,11,20-trione(I), (7c‴) 17α,21 - dihydroxy-1,4-pregnadiene-3,20-dione (I), (7d‴) 11β,17α,21 - trihydroxy-6α-fluoro-4-pregnene-3,20-dione(I), (7e‴) 17α,21-dihydroxy-6α-fluoro-4-pregnene-3,11,20-trione(I), (7f‴) 11β,17α,21 - trihydroxy-6α-fluoro-1,4-pregnadiene-3,20-dione(I), (7g‴) 17α,21 - dihydroxy-6α-fluoro-1,4-pregnadiene-3,11,20-trione(I), (7h‴) 11β,17α,21 - trihydroxy-9α-fluoro-4-pregnene-3,20-dione(I), (7i‴) 17α,21-dihydroxy-9α-fluoro-4-pregnene-3,11,20-trione(I), (7j‴) 9α - fluoro - 11β,17α,21-trihydroxy-1,4-pregnadiene-3,20-dione(I), (7k‴) 9α - fluoro - 11β,17α,21-trihydroxy-4,6-pregnadiene-3,20-dione(I), (7l‴) 11β,17α,21 - trihydroxy-6α-methyl-4-pregnene-3,20-dione(I), (7m‴) 11β,17α,21-trihydroxy-4,6-pregnadiene-3,20-dione(I), (7n‴) 11β,17α,21 - trihydroxy-1,4,6-pregnatriene-3,20-dione(I), (7o‴) 6α,9α - difluoro - 11β,17α,21 - trihydroxy - 4-pregnene-3,20-dione(I), (7p‴) 6α,9α - difluoro-17α,21-dihydroxy-4-pregnene-3,11,20-trione(I), (7q‴) 6α,9α - difluoro-11β,17α,21-trihydroxy-1,4-pregnadiene-3,20-dione(I), (7r‴) 6α,9α - difluoro-17α,21-dihydroxy-1,4-pregnadiene-3,11,20-trione(I), (7s‴) 17α,21-dihydroxy-6α-methyl-1,4-pregnadiene-3,11,20-trione(I), (7t‴) 9α-fluoro-6α-methyl-17α,21-dihydroxy-1,4-pregnadiene-3,11,20-trione(I), (7u‴) 16α - methyl-11β,17α,21-trihydroxy-4-pregnene-3,20-dione(I), (7v‴) 16α-methyl-11β,17α,21-trihydroxy-1,4-pregnadiene-3,20-dione(I), (7w‴) 16α-methyl-17α,21-dihydroxy-1,4-pregnadiene-3,11,20-trione(I), (7x‴) 16α - methyl-17α,21-dihydroxy-4,9(11)-pregnadiene-3,20-dione(I), (7y‴) 16α - methyl-9α-fluoro-11β,17α,21-trihydroxy-4-pregnene-3,20-dione(I), and (7z‴) 16α - methyl-9α-fluoro-11β,17α,21-trihydroxy-1,4-pregnadiene-3,20-dione(I).

By following the procedures disclosed in Examples 1 to 7, starting materials (II) can be prepared having instead of a 1-di-lower-alkylamino group, a corresponding substituent wherein the aforesaid group is replaced by the residue of a heterocyclic radical with attached nitrogen atom containing from 5 to 7 ring atoms, inclusive. The thus substituted starting materials (II) can be converted to their corresponding compounds of Formula IIa, which in turn can be converted to their 21-hydroxy counterparts (I) in accordance with the method set forth in Example 12.

I claim:
1. Compounds of the formula

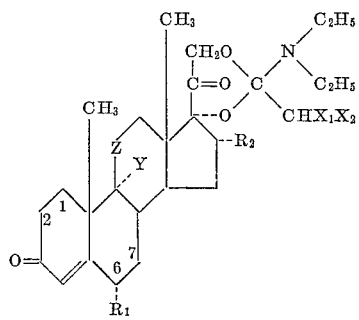

wherein the 1,2- and 6,7-carbon linkages are selected from the group consisting of single bonds and double bonds; $R_1$ is selected from the group consisting of hydrogen, methyl and fluorine; $R_2$ is selected from the group consisting of hydrogen and methyl; $X_1$ is selected from the group consisting of chlorine and fluorine; $X_2$ is selected from the group consisting of chlorine, fluorine and trifluoromethyl; Z is selected from the group consisting of the methylene radical ($>CH_2$), the β-hydroxymethylene radical

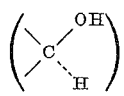

and the carbonyl radical ($>C=O$); Y is hydrogen, and when Z is selected from the group consisting of the β-hydroxymethylene and carbonyl radicals, Y is selected from the group consisting of hydrogen and fluorine; Y and Z taken together is selected from the group consisting of hydrogen and a double bond at the 9(11)-position.

2. 17α,21-(2-chloro-1-diethylamino - 2 - fluoroethylidenedioxy)-4-pregnene-3,20-dione.

3. A compound selected from the group consisting of 17α,21-(2-chloro-1-diethylamino - 2 - fluoroethylidenedioxy)-6α-methyl-4-pregnene-3,20-dione and the corresponding 1-dehydro, 6-dehydro and 1,6-bisdehydro analogues thereof.

4. 17α,21-(2 - chloro - 1 - diethylamino-2-fluoroethylidenedioxy)-11β-hydroxy-4-pregnene-3,20-dione.

5. 17α,21-(2 - chloro - 1 - diethylamino-2-fluoroethylidenedioxy)-11β-hydroxy-1,4-pregnadiene-3,20-dione.

6. A compound selected from the group consisting of 17α,21-(2-chloro-1-diethylamino - 2 - fluoroethylidenedioxy)-11β-hydroxy-16α-methyl-4-pregnene - 3,20 - dione and the corresponding 1-dehydro, 6-dehydro and 1,6-bisdehydro analogues thereof.

7. A compound selected from the group consisting of 17α,21-(2-chloro-1-diethylamino - 2 - fluoroethylidenedioxy)-9α-fluoro-11β-hydroxy-4-pregnene - 3,20 - dione and the corresponding 1-dehydro, 6-dehydro and 1,6-bisdehydro analogues thereof.

8. A compound selected from the group consisting of 17α,21-(2-chloro-1-diethylamino - 2 - fluoroethylidenedioxy)-9α-fluoro-11β-hydroxy-16α-methyl - 4 - pregnene-3, 20-dione and the corresponding 1-dehydro, 6-dehydro and 1,6-bisdehydro analogues thereof.

9. A compound selected from the group consisting of 17α,21-(2-chloro-1-diethylamino - 2 - fluoroethylidenedioxy)-11β-hydroxy-6α-methyl - 4 - pregnene - 3,20 - dione and the corresponding 1-dehydro, 6-dehydro and 1,6-bisdehydro analogues thereof.

10. 17α,21-(2-chloro-1-diethylamino - 2 - fluoroethylidenedioxy)-11β-hydroxy-6α-methyl - 1,4 - pregnadiene-3,20-dione.

11. A compound selected from the group consisting of 17α,21-(2-chloro-1-diethylamino - 2 - fluoroethylidenedioxy)-9α-fluoro-11β-hydroxy-6α-methyl - 4 - pregnene-3, 20-dione and the corresponding 1-dehydro, 6-dehydro and 1,6-bisdehydro analogues thereof.

12. 17α,21-(2-chloro-1-diethylamino - 2 - fluoroethylidenedioxy)-9α-fluoro-11β-hydroxy - 6α - methyl - 1,4-pregnadiene-3,20-dione.

13. A compound selected from the group consisting of 17α,21-(2-chloro-1-diethylamino - 2 - fluoroethylidenedioxy)-6α,16α-dimethyl-11β-hydroxy - 4 - pregnene-3,20-dione and the corresponding 1-dehydro, 6-dehydro and 1, 6-bisdehydro analogues thereof.

14. A compound selected from the group consisting of 17α,21-(2-chloro-1-diethylamino - 2 - fluoroethylidenedioxy)-6α,16α-dimethyl-9α-fluoro-11β-hydroxy - 4 - pregnene-3,20-dione and the corresponding 1-dehydro, 6-dehydro and 1,6-bisdehydro analogues thereof.

15. A compound selected from the group consisting of 17α,21-(2-chloro-1-diethylamino - 2 - fluoroethylidenedioxy)-6α-fluoro-11β-hydroxy-4-pregnene - 3,20 - dione and the corresponding 1-dehydro, 6-dehydro and 1,6-bisdehydro analogues thereof.

16. A compound selected from the group consisting of 17α,21-(2-chloro-1-diethylamino - 2 - fluoroethylidenedioxy)-6α,9α-difluoro-11β-hydroxy - 4 - pregnene - 3,20-dione and the corresponding 1-dehydro, 6-dehydro and 1,6-bisdehydro analogues thereof.

17. A compound selected from the group consisting of 17α,21-(2-chloro-1-diethylamino - 2 - fluoroethylidenedioxy)-6α-fluoro-16α-methyl-11β-hydroxy - 4 - pregnene-3, 20-dione and the corresponding 1-dehydro, 6-dehydro and 1,6-bisdehydro analogues thereof.

18. A compound selected from the group consisting of 17α,21-(2-chloro-1-diethylamino - 2 - fluoroethylidenedioxy)-6α,9α-difluoro-16α-methyl-11β-hydroxy - 4 - pregnene-3,20-dione and the corresponding 1-dehydro, 6-dehydro and 1,6-bisdehydro analogues thereof.

19. A process for the production of a compound of the Formula II

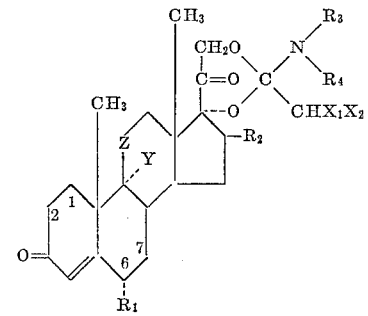

(II)

wherein 1,2- and 6,7-carbon linkages are selected from the group consisting of single bonds and double bonds; $R_1$ is selected from the group consisting of hydrogen, methyl and fluorine; $R_2$ is selected from the group consisting of hydrogen and methyl; $R_3$ and $R_4$ taken individually represent lower-alkyl and $R_3$ and $R_4$ taken together with the attached nitrogen atom represent the residue of a heterocyclic radical containing from five to seven ring atoms, inclusive; $X_1$ is selected from the group consisting of chlorine and fluorine; $X_2$ is selected from the group consisting of chlorine, fluorine and trifluoromethyl; Z is selected from the group consisting of the methylene radical ($>CH_2$), the β-hydroxymethylene radical

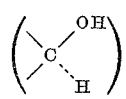

and the carbonyl radical ($>C=O$); Y is hydrogen, and when Z is selected from the group consisting of the β-hydroxymethylene and carbonyl radicals, Y is selected from the group consisting of hydrogen and fluorine; Y and Z taken together is selected from the group consisting of hydrogen and a double bond at the 9(11)-position, which comprises treating a corresponding compound of the Formula I

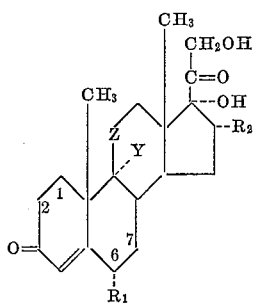

(I)

wherein $R_1$, $R_2$, Y, Z, 1, 2 and 6, 7 have the same meanings as above, with a reagent of the Formula A

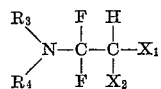

(A)

wherein $R_3$, $R_4$, $X_1$ and $X_2$ have the same meanings as above.

20. A process for the production of a compound of the Formula I

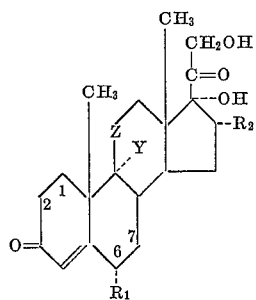

(I)

wherein the 1,2- and 6,7-carbon linkages are selected from the group consisting of single and double bonds; $R_1$ is selected from the group consisting of hydrogen, methyl and fluorine; $R_2$ is selected from the group consisting of hydrogen and methyl; Z is selected from the group consisting of the methylene radical ($>CH_2$), the β-hydroxy-methylene radical

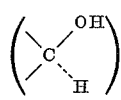

and the carbonyl radical ($>C=O$); Y is hydrogen, and when Z is selected from the group consisting of the β-hydroxy-methylene and carbonyl radicals, Y is selected from the group consisting of hydrogen and fluorine; Y and Z taken together is selected from the group consisting of hydrogen and a double bond at the 9(11)-position, which comprises subjecting to acid hydrolysis a corresponding compound of the Formula II

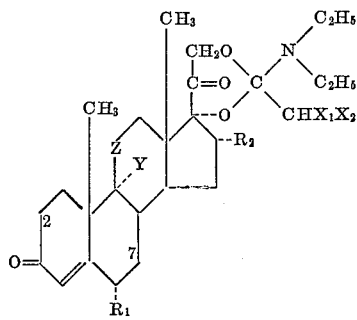

(II)

wherein $R_1$, $R_2$, Y, Z, 1,2 and 6,7 have the same meanings as above; $X_1$ is selected from the group consisting of chlorine and fluorine; $X_2$ is selected from the group consisting of chlorine, fluorine and trifluoromethyl, to yield a corresponding compound of the Formula IIa.

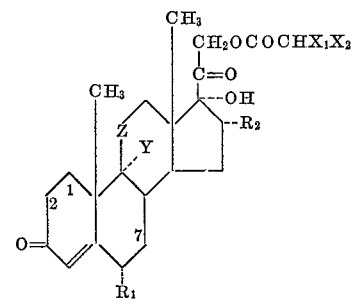

(IIa)

wherein $R_1$, $X_2$, $X_1$, $X_2$, Y, Z, 1,2 and 6,7 have the same meanings as above, and subjecting a thus produced compounds of Formula IIa to hydrolysis with a base to give a corresponding compound of Formula I, above.

No references cited.

UNITED STATES PATENT OFFICE
CERTIFICATE OF CORRECTION

Patent No. 3,153,645                          October 20, 1964

Donald E. Ayer

It is hereby certified that error appears in the above numbered patent requiring correction and that the said Letters Patent should read as corrected below.

Column 4, line 13, for "compou.." read -- compounds --; line 28, for "high" re.. -- .ghly --; column 5, line 31, for "N-(2-chloro-1,2-trifluoroethy_)" read -- N-(2-chloro-1,1,2-trifluoroethyl) --; line 65, for "same" read -- some --; column 13, line 72, for "-dihydroxyl,4-" read -- -dihydroxy-1,4- --; column 16, Formulas II and IIa, the lower portion of each formula should appear as shown below instead of as in the patent:

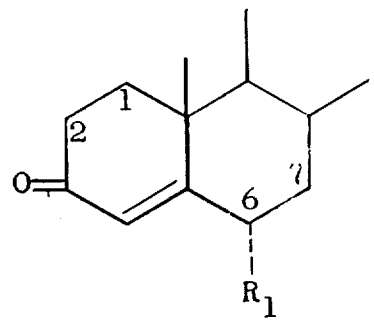

same column 18, line 44, for "$R_1, X_2$," read -- $R_1, R_2$, --.

Signed and sealed this 16th day of February 1965.

(SEAL)
Attest:

ERNEST W. SWIDER                                  EDWARD J. BRENNER
Attesting Officer                                  Commissioner of Patents